Nov. 19, 1963    H. J. HAMMERLY ETAL    3,111,354
CIRCUIT BREAKER PANEL ASSEMBLY
Filed Aug. 12, 1960
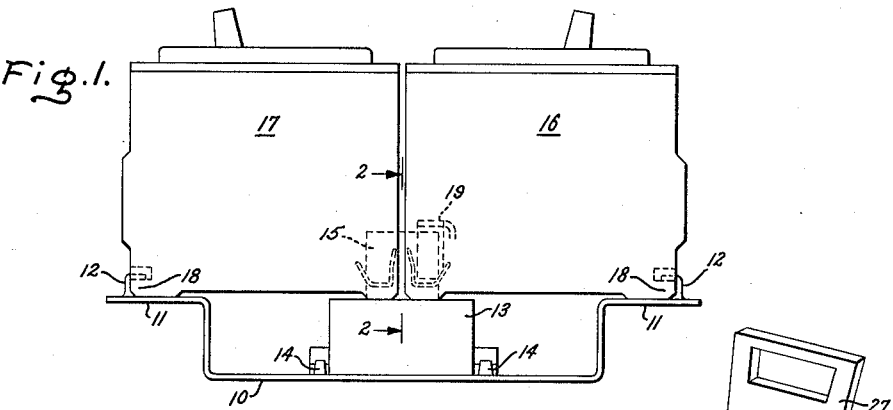
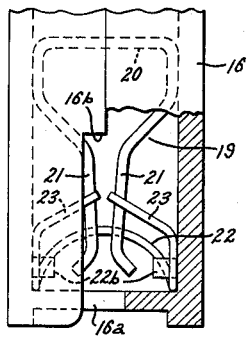
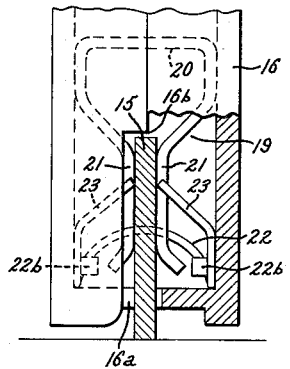
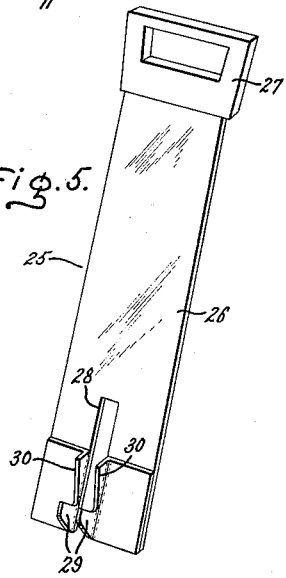
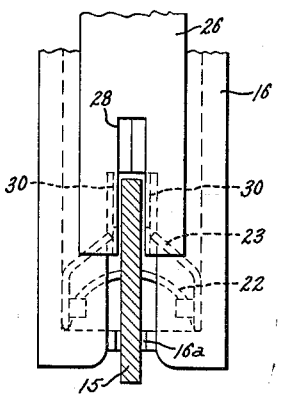
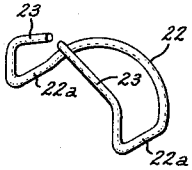
Inventors:
Herman J. Hammerly,
Rynold A. Salomone,
BY Robert T. Casey
Attorney.

United States Patent Office 3,111,354
Patented Nov. 19, 1963

3,111,354
CIRCUIT BREAKER PANEL ASSEMBLY
Herman J. Hammerly and Rynold A. Salomone, Plainville, Conn., assignors to General Electric Company, a corporation of New York
Filed Aug. 12, 1960, Ser. No. 49,193
3 Claims. (Cl. 339—75)

Our invention relates to electric apparatus assemblies and particularly to assemblies of circuit protective devices which are mountable at least in part by plug-in action, such for example as that shown in Patent 2,738,446, W. J. Fleming, assigned to the same assignee as the present invention.

Electric circuit breakers of the type used in protecting branch wiring circuits such as in the home or commercial and industrial buildings are commonly mounted by a simple hook-on and plug-in motion. Since such circuit breakers are very easy to install and do not require the use of tools to connect them to the live side of the circuit, it is easy for the user to change such circuit breakers after initial installation. In so doing, it is quite possible that a breaker of given rating will be removed and replaced by a circuit breaker of higher rating. If this is done, of course, the branch circuit connected thereto will not be adequately protected, and a danger of fire will exist. Accordingly, various systems have been developed to prevent the improper interchanging of circuit breakers (i.e., substitution of a high-rated breaker for a lower-rated breaker). Such systems for providing "non-interchangeability" of plug-in type circuit breakers are relatively complex, however, and require the expenditure of effort on the part of the installing electrician in becoming acquainted with the procedures and methods to be utilized, and in carrying them out. In addition, such systems have added to the cost of such equipment.

It is an object of the present invention to provide a means for guarding against the indiscriminate or improper interchanging of circuit breakers, which will not require any special instructions to the installing electrician.

It is another object of the invention to provide a means for guarding against the improper interchanging of plug-in type circuit breakers which does not add perceptibly to the cost of the circuit breaker assembly.

It is a further object of the invention to provide a plug-in type circuit breaker panel assembly which, while preventing the improper changing of circuit breakers by unauthorized personnel, makes possible the changing of circuit breakers by properly authorized personnel.

In accordance with the invention, we provide an electric circuit breaker panel assembly including a support, a plurality of relatively stationary line contact means, and a plurality of circuit protective devices adapted to be mounted in engagement with the line terminal means by plug-in engagement, and means which is engaged upon plug-in mounting of each the devices for normally preventing the withdrawal of said device. More specifically, we provide a locking-member or clip carried by each of the circuit breakers adjacent its plug-in line contact and adapted to engage the stationary contact member of the panel to prevent withdrawal.

In accordance with another aspect of the invention, we provide means for releasing the locking-member of each circuit breaker comprising a specially designed tool to be retained and utilized by authorized personnel only.

Our invention will be more completely understood from the following detailed description, and its scope will be pointed out in the appended claims.

In the drawings,
FIGURE 1 is an elevation view of a circuit breaker panel assembly incorporating the invention;

FIGURE 2 is a partial sectional view taken on the line 2—2 of FIGURE 1;
FIGURE 3 is a view similar to FIGURE 2 but showing the circuit breaker removed from the panel assembly;
FIGURE 4 is a perspective view of the locking clip utilized in the assembly of FIGURE 1;
FIGURE 5 is a perspective view of a releasing tool for use with the assembly of FIGURE 1; and
FIGURE 6 is a view similar to FIGURE 2, but showing the releasing tool of FIGURE 5 in use.

In the drawings, the invention is shown as incorporated in a panel assembly comprising a supporting pan 10 having a generally channel-shaped central portion and a pair of outwardly directed flange portions 11. The flange portions 11 are provided with a series of retaining hooks 12 (only two shown) for a purpose to be described.

Supported on the back wall of the supporting pan 10 is an insulating block or base 13 retained on the supporting pan 10 by means of lugs 14 overlying shoulder portions of the base 13. Mounted on the base 13 are plurality of stationary contact blades 15 (only one shown) disposed in a row along the central line of the supporting pan 10.

A pair of electric circuit breakers 16 and 17 are supported upon the pan 10, in plug-in electrical engagement with the contact blade 15, in a manner to be described. Each of the circuit breakers 16 and 17 includes an integral shoulder or lug portion 18 extending under one of the retaining hooks 12. Each of the circuit breakers 16 and 17 carries a plug-in type electric socket member 19 as shown more particularly in FIGURES 2 and 3. Each of the sockets 19 comprises a generally U-shaped resilient flat conductive member having a bight portion 20 and inwardly offset leg portions 21. The housing of the circuit breakers 16 and 17 each include a corner slot 16a, 17a (see FIGURES 2 and 3), to permit the entry of a portion of the contact blade 15 into plug-in engagement between the side portions 21 of the socket 19, as shown in FIGURE 2.

For the purpose of locking the circuit breakers 16 and 17 in position once they have been inserted on the contact blade 15, in a nonremovable manner (except when released by use of a special tool to be described hereinafter), we provide a generally U-shaped locking-member 22, trapped within the insulating casing of each of the circuit breakers 16 and 17 respectively. The locking-member 22 includes side portions 22a which extend under the bosses 22b of the insulating casing, being trapped between these bosses and the bottom wall of the casing. The locking-member 22 has its ends 23 spaced closely apart and at an angle to each other so as to permit the entry of the blade 15, the ends 23 being resiliently forced apart thereby. Each of the circuit breakers 16 and 17 may, therefore, be mounted and assembled on the panel by simply hooking the lug portion 18 of the breaker casing under the hook 12, and rotating the breaker about the hook as a pivot, into plug-in engagement with the blade 15.

If the user should attempt to remove one of the circuit breakers 16, 17, the ends 23 of the locking-member 22 bite into the contact blade 15 and prevent such removal. Because of the angular disposition of the end portions of the locking member 22, any attempt to pull the circuit breakers 16, 17, outwardly after the ends 23 have become engaged in the blade 15 only tends to increase the locking effect, and positively prevents such removal. Because of the inherent resilience of the locking-member 22, it cannot be deformed by twisting or rocking the breaker.

For the purpose of permitting removal of circuit breakers by authorized personnel, we provide a special removing tool 25, FIGURE 5. The tool 25 comprises a thin, flat metallic strip body 26 having an insulating handle 27 at one end, a slot 28 extending a short way in from its opposite end, and having a pair of outwardly directed hook portions 29 positioned at either side of the slot 28.

In operation, the removal tool 25 is inserted between a pair of circuit breakers such as 16 and 17, and is pushed downwardly until the hook portions 29 enter the slot 16a or 17a of the circuit breakers and are engaged under the end portions 23 of the clip 22. The tool 25 is then pulled outwardly. The action of the hooks 29 on the ends 23 is to force them outwardly away from the blade 15 a small amount. Further upward travel of the tool causes the projection 29 to enter between the ends 23 of the clip 22, thereby assuring that the ends 23 will not engage the blade 15 during further upward movement. The further upward travel of the tool 25 with respect to the circuit breaker itself is limited, by engagement of the shoulders 30 of the hook portions 28 with the end wall 16b of the slot 16a in the circuit breaker housing. Further upward motion of the tool 25 raises the end of the circuit breaker and removes it from engagement with the blade 15, permitting complete removal of the breaker.

While we have described only one particular embodiment of the invention, it will be readily apparent that many modifications thereof may be made, and we therefore intend by the appended claims to cover all such modifications as well within the true spirit and scope of the invention.

What we claim as new and desire to secure by Letters Patent of the United States is:

1. For use in releasing an electrical control device having a socket therein from plug-in engagement with a contact blade, a releasing tool comprising a generally wide, thin, flat, elongated member having a slot cut inwardly a short distance from one end and having a pair of thin flat projections adjacent said end and disposed on opposite sides of said slot, said projections each having a hook portion adjacent the end thereof and a longitudinally spaced shoulder portion.

2. Electrical apparatus comprising a support having a stationary contact blade mounted thereon, an electrical control device having a generally rectangular insulating casing having a slot in one corner thereof, an electric socket member within said casing adjacent said slot adapted to engage said contact blade when inserted in said slot, a retaining clip within said casing including a pair of angularly disposed end portions extending into the path of movement of said contact blade to permit insertion of said contact blade into said socket but to prevent removal of said contact blade therefrom, and a releasing tool comprising a relatively wide, thin, flat, elongated member having a slot in one end thereof to fit over said contact blade, said releasing tool also including a pair of relatively thin sheet metal projections at either side of said slot and extending generally perpendicular to the plane of said elongated member, said projections each having a hook portion and a shoulder portion spaced longitudinally of said slot, said hook and shoulder portions being arranged so that said hook portions engage said end portions of said retaining clip and then enter between said end portions to retain them away from said contact blade while said shoulder portions engage the end wall of said slot in said casing to provide an engagement by which said device may be lifted out of engagement with said blade.

3. An electric circuit controlling device comprising an insulating casing having a socket chamber therein, a plug-in type electrical socket contained in said chamber and comprising a generally U-shaped conductive member having the sides of said U in closely spaced arrangement adjacent said opening to said chamber, an elongated generally U-shaped resilient wire member having the bight portion thereof extending transversely of said socket member and having the ends of the arms thereof disposed at an angle toward each other in the path of entry of a cooperating electrical contact member into said electrical socket, said arms of said wire member converging in the direction of entry of said cooperating contact member to engage opposite sides of said contact member to prevent withdrawal of said contact from said socket, means preventing movement of said wire member further into said casing as said contact member is inserted into said socket, and means preventing movement of said wire member outwardly of said casing as said contact member is drawn outwardly of said socket.

References Cited in the file of this patent
UNITED STATES PATENTS

| | | |
|---|---|---|
| 1,983,281 | Fries et al. | Dec. 4, 1934 |
| 2,149,550 | Richards et al. | Mar. 7, 1939 |
| 2,402,491 | Fitzgerald | June 18, 1946 |
| 2,738,445 | Hammerly et al. | Mar. 13, 1956 |
| 2,780,791 | Morschel | Feb. 5, 1957 |
| 2,795,677 | Slater | June 11, 1957 |
| 2,883,641 | Despard | Apr. 21, 1959 |